US012806694B2

(12) United States Patent
Fukuhara et al.

(10) Patent No.: US 12,806,694 B2
(45) Date of Patent: Nov. 24, 2026

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventors: Yousuke Fukuhara, Kyoto (JP); Eri Yamaguchi, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 422 days.

(21) Appl. No.: 18/568,847

(22) PCT Filed: Jul. 1, 2022

(86) PCT No.: PCT/JP2022/026466
§ 371 (c)(1),
(2) Date: Dec. 11, 2023

(87) PCT Pub. No.: WO2023/277182
PCT Pub. Date: Jan. 5, 2023

(65) Prior Publication Data
US 2024/0278331 A1 Aug. 22, 2024

(30) Foreign Application Priority Data
Jul. 1, 2021 (JP) ................................ 2021-110210

(51) Int. Cl.
*B23B 27/16* (2006.01)
*B23B 1/00* (2006.01)
(Continued)

(52) U.S. Cl.
CPC ............ *B23B 27/1611* (2013.01); *B23B 1/00* (2013.01); *B23B 27/04* (2013.01); *B23B 29/043* (2013.01)

(58) Field of Classification Search
CPC ............... B23B 27/1611; B23B 29/043; B23B 2200/088; B23B 2200/165; B23B 27/04; B23B 1/00
See application file for complete search history.

(56) References Cited

U.S. PATENT DOCUMENTS 5,511,911 A * 4/1996 Katbi .................... B23B 27/045 407/116
RE37,595 E * 3/2002 Lindstedt ............. B23B 27/045 407/116
(Continued)

FOREIGN PATENT DOCUMENTS

CN 102947029 A 2/2013
JP 2007069290 A * 3/2007
(Continued)

*Primary Examiner* — Sara Addisu
(74) *Attorney, Agent, or Firm* — HAUPTMAN HAM, LLP

(57) ABSTRACT

A cutting insert according to one non-limiting example has a quadrangular prism shape extending from a front end toward a rear end along a central axis, and comprises a cutting portion, and a main body portion. The main body portion has an upper surface having a V-shaped flute extending along the central axis. An opening portion and a bottom portion of the flute each have a convex shape protruding upward in a direction along the central axis. A first flute has a first region positioned on the rear end side and a second region positioned on the front end side with respect to the first region. An opening angle of the first flute in the first region is smaller than an opening angle of the first flute in the second region.

9 Claims, 16 Drawing Sheets

(51) Int. Cl.
*B23B 27/04* (2006.01)
*B23B 29/04* (2006.01)

(56) References Cited

U.S. PATENT DOCUMENTS

| | | | | |
|---|---|---|---|---|
| 12,172,219 | B2 * | 12/2024 | Hecht | B23B 27/086 |
| 2006/0147281 | A1 * | 7/2006 | Nagaya | B23B 27/04 407/117 |
| 2008/0240875 | A1 * | 10/2008 | Nagaya | B23B 27/10 407/113 |
| 2009/0285645 | A1 * | 11/2009 | Hecht | B23B 27/04 407/107 |
| 2010/0119314 | A1 * | 5/2010 | Nagaya | B23B 27/04 408/1 R |
| 2011/0255926 | A1 * | 10/2011 | Hecht | B23B 27/04 407/66 |
| 2013/0058729 | A1 * | 3/2013 | Choi | B23B 27/045 407/107 |
| 2013/0183109 | A1 * | 7/2013 | Fujii | B23B 27/22 407/115 |
| 2013/0192431 | A1 * | 8/2013 | Inoue | B23B 27/045 407/115 |
| 2013/0251465 | A1 * | 9/2013 | Inoue | B23B 27/1611 407/107 |
| 2015/0056029 | A1 * | 2/2015 | Shimamoto | B23B 27/045 407/115 |
| 2017/0106451 | A1 * | 4/2017 | Inoue | B23B 27/045 |
| 2017/0157678 | A1 * | 6/2017 | Inoue | B23B 27/14 |
| 2021/0260669 | A1 | 8/2021 | Fukuhara | |
| 2023/0137637 | A1 * | 5/2023 | Athad | B23B 29/043 407/113 |
| 2024/0075535 | A1 * | 3/2024 | Guy | B23B 27/1611 |
| 2024/0278331 | A1 * | 8/2024 | Fukuhara | B23B 27/04 |
| 2024/0286201 | A1 * | 8/2024 | Fukuhara | B23B 27/04 |
| 2025/0303475 | A1 * | 10/2025 | Zeeb | B23B 27/04 |

FOREIGN PATENT DOCUMENTS

| | | | | |
|---|---|---|---|---|
| JP | 2014097571 | A | 5/2014 | |
| JP | 2020185629 | A | 11/2020 | |
| WO | WO-2015020274 | A1 * | 5/2015 | B23B 27/14 |
| WO | WO-2015099369 | A1 * | 7/2015 | B23B 29/043 |
| WO | WO-2018084110 | A1 * | 5/2018 | B23B 27/22 |
| WO | 2020009002 | A1 | 1/2020 | |

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2022/026466 filed on Jul. 1, 2022, which claims priority to Japanese Patent Application No. 2021-110210, filed on Jul. 1, 2021.

TECHNICAL FIELD

The present disclosure relates to a cutting insert (hereinafter, simply referred to as "insert") to be used for carrying out cutting processing of a workpiece. Examples of the cutting processing may include flute-forming processing and cutting-off processing.

BACKGROUND OF INVENTION

As a cutting tool to be used for carrying out cutting processing of a workpiece, a cutting tool described in Patent Document 1 is used for example. An insert in the cutting tool described in Patent Document 1 has an upper surface provided with a V-shaped flute extending along an axis. The insert is secured to a holder by bringing the flute in the upper surface of the insert into contact with an upper jaw of the holder. The insert can be attached to and detached from the holder by sliding the insert in an axial direction with respect to the holder.

CITATION LIST

Patent Literature

Patent Document 1: JP 2007-069290 A

SUMMARY

A cutting insert (insert) according to one non-limiting aspect of the present disclosure has a quadrangular prism shape extending from a front end toward a rear end along a central axis, and includes a cutting portion positioned on the front end side and including a cutting edge positioned on the front end, and a main body portion positioned on the rear end side with respect to the cutting portion. The main body portion has an upper surface with a V-shaped flute extending parallel to the central axis, a lower surface positioned on a side opposite from the upper surface, and a side surface connected to the upper surface and the lower surface and extending along the central axis. An opening portion and a bottom portion of the flute each have a convex shape protruding upward in a direction along the central axis. The flute has a first region positioned on the rear end side, and a second region positioned on the front end side with respect to the first region. An opening angle of the flute in the first region is smaller than an opening angle of the flute in the second region.

DESCRIPTION OF EMBODIMENTS

An insert 1 of one non-limiting aspect of the present disclosure will be described in detail with reference to the drawings. However, in each of the drawings, which will be referred to below, only main members necessary for description of non-limiting embodiments are simplified and illustrated for convenience of description. Thus, the insert 1 may include any constituent member not illustrated in each of the drawings referred to. The dimensions of members in the respective drawings do not accurately represent the actual dimensions of constituent members, the dimensional ratio of respective members, and the like.

Figure 1:
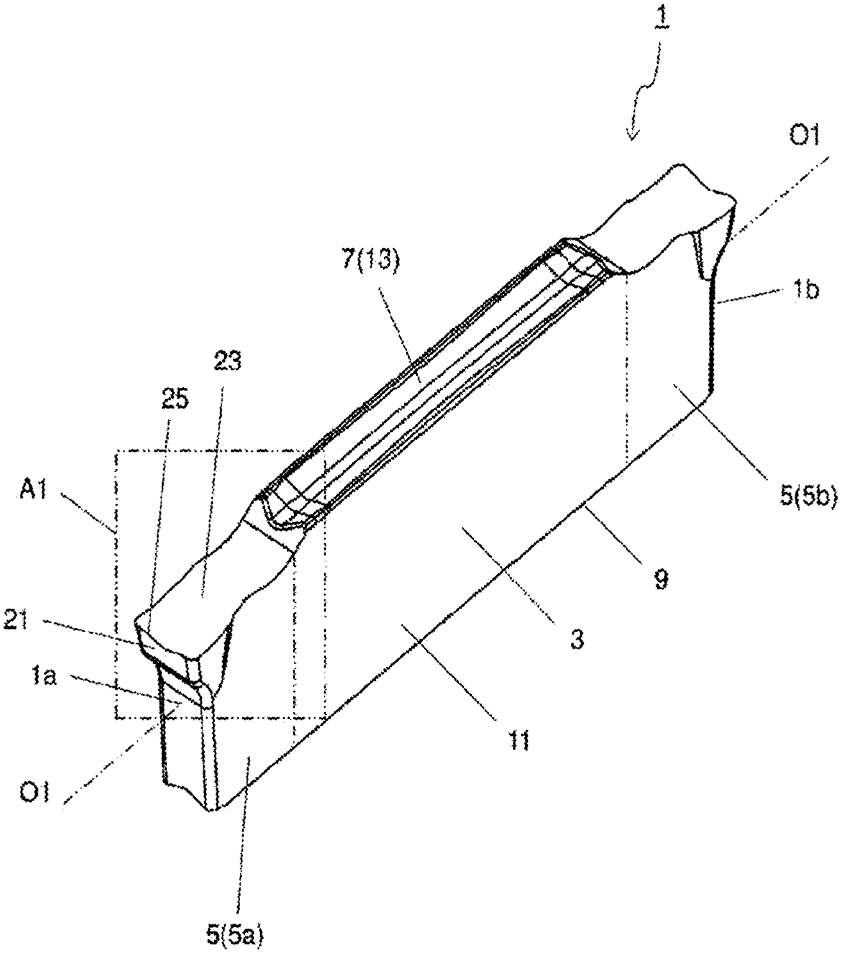
FIG. 1 is a perspective view illustrating an insert of a non-limiting embodiment.
Figure 2:
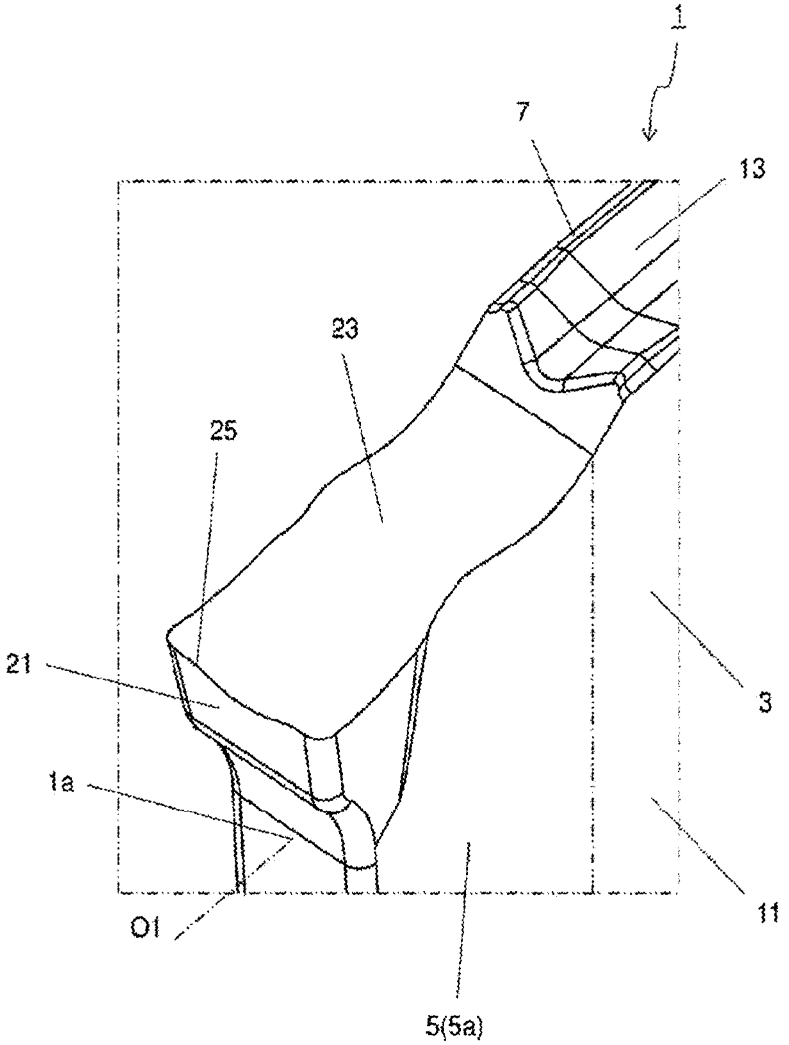
FIG. 2 is an enlarged view of a region A1 illustrated in FIG. 1.
Figure 3:
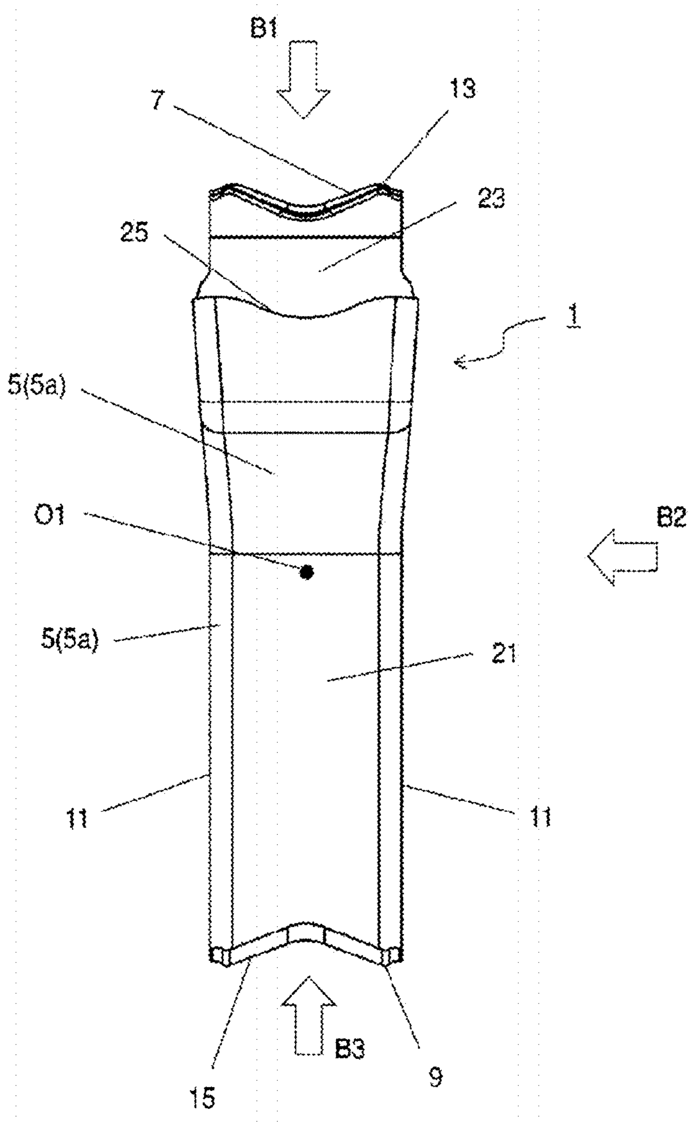
FIG. 3 is a plan view of the insert illustrated in FIG. 1 viewed from a front end side.
Figure 4:
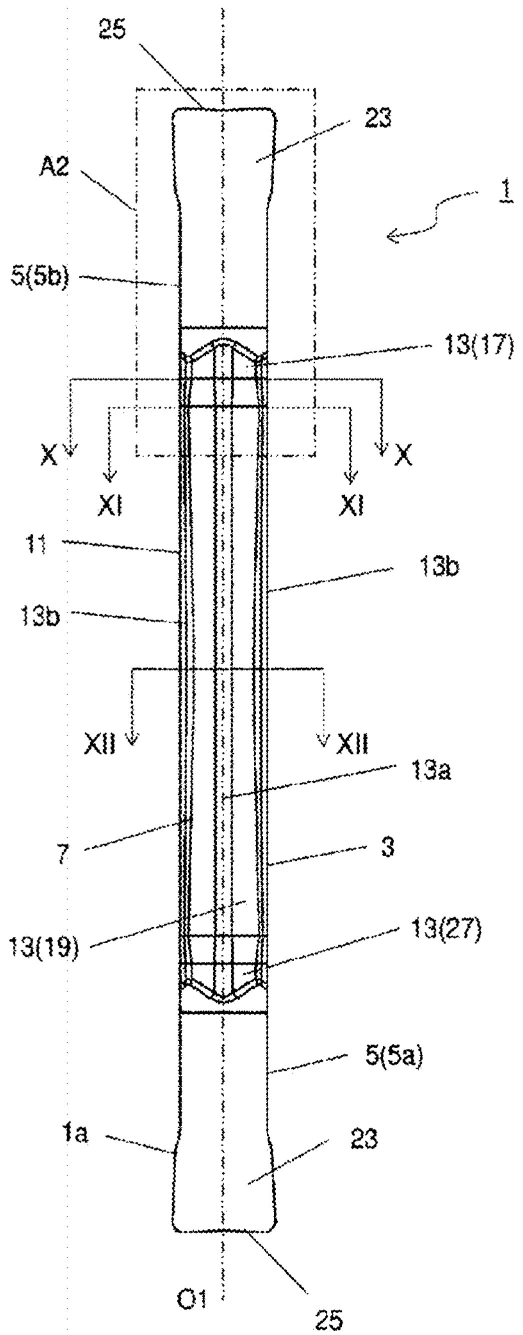
FIG. 4 is a side view of the insert illustrated in FIG. 3 viewed from a B1 direction.

As in a non-limiting example illustrated in FIG. 1, the insert 1 has a columnar shape extending from a front end 1*a* toward a rear end 1*b* along a central axis O1, and may have a main body portion 3 and a cutting portion 5. The main body portion 3 may be a portion that is held by a holder. The cutting portion 5 may include a cutting edge, and may be a portion to be used for carrying out cutting processing of a workpiece for manufacturing a machined product. The insert 1 having a columnar shape may have, for example, a cylindrical shape or a polygonal prism shape. The insert 1 having a polygonal prism shape may have, for example, a quadrangular prism shape, a pentagonal prism shape, or a hexagonal prism shape.

The insert 1 may include one or two or more cutting portions 5. For example, the insert 1 may have two cutting portions 5 as in the non-limiting example illustrated in FIG. 1. The cutting portion 5 may be positioned on the front end 1*a* side or rear end 1*b* side with respect to the main body portion 3.

As the two cutting portions 5 in the non-limiting example illustrated in FIG. 1, the insert 1 may have a first cutting portion 5*a* and a second cutting portion 5*b*. The first cutting portion 5*a* may be positioned on the front end 1*a* side of the insert 1. In other words, the main body portion 3 may be positioned on the rear end 1*b* side of the insert 1 with respect to the first cutting portion 5*a*. The above description shows a relative positional relationship between the main body portion 3 and the first cutting portion 5*a*. Thus, a part of the main body portion 3 may be positioned on the front end 1*a* side with respect to a central portion of the insert 1.

The second cutting portion 5*b* may be positioned on the rear end 1*b* side of the insert 1. In other words, the main body portion 3 may be positioned on the front end 1*a* side of the insert 1 with respect to the second cutting portion 5*b*. The above description indicates a relative positional relationship between the main body portion 3 and the second cutting portion 5*b*. Thus, a part of the main body portion 3 may be positioned on the rear end 1*b* side with respect to the central portion of the insert 1. The insert 1 having the first cutting portion 5*a* and the second cutting portion 5*b* may generally be referred to as a dog bone type.

The first cutting portion 5*a* and the second cutting portion 5*b* may have different configurations from each other and may have the same configuration as each other. For example, as in the non-limiting example illustrated in FIG. 1, when the front end 1*a* and the rear end 1*b* of the insert 1 are reversed, the first cutting portion 5*a* and the second cutting portion 5*b* may have the same configuration. In the non-limiting example illustrated in FIG. 1, since the first cutting portion 5*a* and the second cutting portion 5*b* have the same configuration, the description of the second cutting portion 5*b* will be omitted as appropriate in the following description.

The sizes of the main body portion 3, the first cutting portion 5*a*, and the second cutting portion 5*b* are not limited to specific values. For example, a length of the main body portion 3 in a direction along the central axis O1 may be set to about 10 to 25 mm. A length of the first cutting portion 5*a* in the direction along the central axis O1 may be set about 2 to 6 mm.

The main body portion 3 may have an upper surface 7, a lower surface 9, and a pair of side surfaces 11. The lower surface 9 may be positioned on a side opposite from the upper surface 7. A width of the upper surface 7 orthogonal to the central axis O1 is an upper width, and a width of the lower surface 9 orthogonal to the central axis O1 is a lower width. The upper width and the lower width may be the same value, and the lower width may be smaller than the upper width. A direction orthogonal to the central axis O1 and connecting the upper surface 7 and the lower surface 9 is a vertical direction, and a direction orthogonal to the central axis O1 and the vertical direction and connecting the pair of side surfaces 11 is a lateral direction.

Each of the pair of side surfaces 11 may be positioned between the upper surface 7 and the lower surface 9. Each of the upper surface 7, the lower surface 9, and the pair of side surfaces 11 may have a rectangular shape extending along the central axis O1 when viewed from the front. When the upper width and the lower width have the same value, a distance between the pair of side surfaces 11 may be constant. When the lower width is smaller than the upper width, the distance between the pair of side surfaces 11 may become narrower toward the lower surface 9.

The upper surface 7 may include a first flute 13. The first flute 13 may have a V-shape extending parallel along the central axis O1. The configuration that the first flute 13 has a V-shape may mean that a width of the first flute 13 becomes narrower toward a bottom portion 13*a*, in other words, toward the lower surface 9, in a cross section orthogonal to the central axis O1. The bottom portion 13*a* of the first flute 13 may mean a portion of the first flute 13 that is closest to the lower surface 9 in the cross section orthogonal to the central axis O1.

In the cross section orthogonal to the central axis O1, when virtual straight lines connecting the bottom portion 13*a* of the first flute 13 and two opening portions 13*b* of the first flute 13 are set, an intersection angle of these virtual straight lines may be an opening angle $\theta 1$ of the first flute 13. For example, in the cross section orthogonal to the central axis O1, when the first flute 13 is represented by two straight lines, an intersection angle of these straight lines may be the opening angle $\theta 1$ of the first flute 13.

The first flute 13 may extend to an end portion on the front end 1*a* side of the main body portion 3, and may be distant from the end portion on the front end 1*a* side of the main body portion 3. The first flute 13 may extend to an end portion on the rear end 1*b* side of the main body portion 3, and may be distant from the end portion on the rear end 1*b* side of the main body portion 3.

Figure 7:
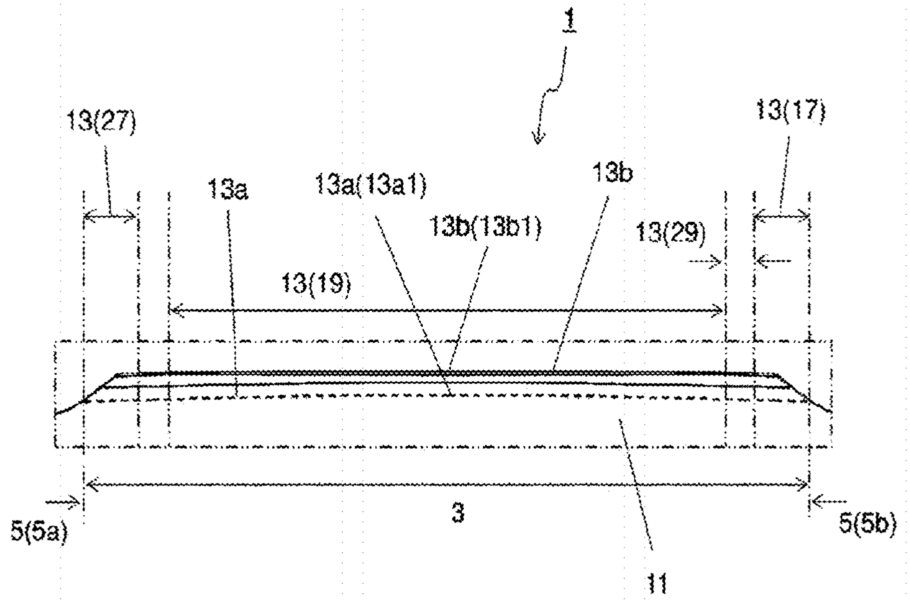
FIG. 7 is an enlarged view of a region A3 illustrated in FIG. 6.

Each of the opening portion 13*b* and the bottom portion 13*a* of the first flute 13 may have a convex shape protruding upward in the vertical direction. Specifically, when the first flute 13 is viewed in a cross section along the central axis O1 and including the bottom portion 13*a* of the first flute 13, the bottom portion 13*a* at a central portion of the first flute 13 may be positioned above the bottom portion 13*a* at both ends of the first flute 13. For example, as in a non-limiting example illustrated in FIG. 7, the bottom portion 13*a* at the central portion of the first flute 13 may be positioned above a virtual straight line connecting the bottom portion 13*a* at both ends of the first flute 13 in the direction along the central axis O1.

When the bottom portion 13*a* of the first flute 13 is configured as described above, the insert 1 can be easily attached to and detached from the holder. For example, in the case where a cutting tool is attached to a machine tool such that the front end 1*a* of the insert 1 faces downward, if a force of gripping the insert 1 by the holder is weak, the insert 1 may fall.

For this reason, when attaching the insert 1 to the holder, it is necessary to increase the force of gripping the insert 1 by the holder while pressing the insert 1 against the holder. For removing the insert 1 from the holder, it is necessary to weaken the force of gripping the insert 1 by the holder while pressing the insert 1 against the holder. For this reason, the process of attaching and detaching the insert 1 may become complicated.

However, when the bottom portion 13*a* of the first flute 13 is configured as described above, the insert 1 is unlikely to fall. This is because when the insert 1 is attached to and detached from the holder, a top portion 13*al* positioned at the uppermost position of the bottom portion 13*a* is likely to be caught by the holder. For this reason, the insert 1 is less likely to fall, and the insert 1 is easily attached to and detached from the holder.

When viewed from a side, the opening portion 13*b* at the central portion of the first flute 13 may be positioned above the opening portion 13*b* at both ends of the first flute 13. For example, as in the non-limiting example illustrated in FIG. 7, the opening portion 13*b* at the central portion of the first flute 13 may be positioned above a virtual straight line connecting the opening portion 13*b* at both ends of the first flute 13.

A case will be described below in which the bottom portion 13*a* of the first flute 13 has a convex shape protruding upward in the direction along the central axis O1 and a height of the opening portion 13*b* of the first flute 13 is constant. In this case, a depth of the first flute 13 at the central portion of the first flute 13 may be shallower than the depths at both ends of the first flute 13. For this reason, when the insert 1 is attached to and detached from the holder, the position of the insert 1 is shifted in the lateral direction, or the insert 1 may be detached from the holder in the lateral direction.

However, when the opening portion 13*b* of the first flute 13 is configured as described above, the depth of the first flute 13 at the central portion of the first flute 13 is easily secured. For this reason, when the insert 1 is attached to and detached from the holder, the first flute 13 is likely to be stably caught by the holder with respect to the position shift of the insert 1 in the lateral direction. As a result, the position of the insert 1 is less likely to be shifted in the lateral direction, and the insert 1 is less likely to be detached from the holder in the lateral direction.

In the direction along the central axis O1, the top portion 13*al* at the bottom portion 13*a* of the first flute 13 and a top portion 13*b*1 positioned at the uppermost position of the opening portion 13*b* of the first flute 13 may be positioned at the same position. In this case, the depth of the first flute 13 at the central portion of the first flute 13 is easily secured. For this reason, when the insert 1 is attached to and detached from the holder, the position of the insert 1 is further less likely to be shifted in the lateral direction.

The convex shape of each of the bottom portion 13*a* and the opening portion 13*b* is not limited to a specific shape. The convex shape may be, for example, a triangular shape or a trapezoidal shape. The opening portion 13*b* of the first flute 13 may have a convex curve shape protruding upward in the direction along the central axis O1. In the case where the opening portion 13*b* has the above-described convex curve shape, the opening portion 13*b* is less likely to be chipped when the insert 1 is attached to and detached from the holder.

The bottom portion 13*a* of the first flute 13 may have a convex curve shape protruding upward in the direction along the central axis O1. In the case where the bottom portion 13*a* has the above-described convex curve shape, the bottom portion 13*a* is less likely to be chipped when the insert 1 is attached to and detached from the holder.

Figure 8:
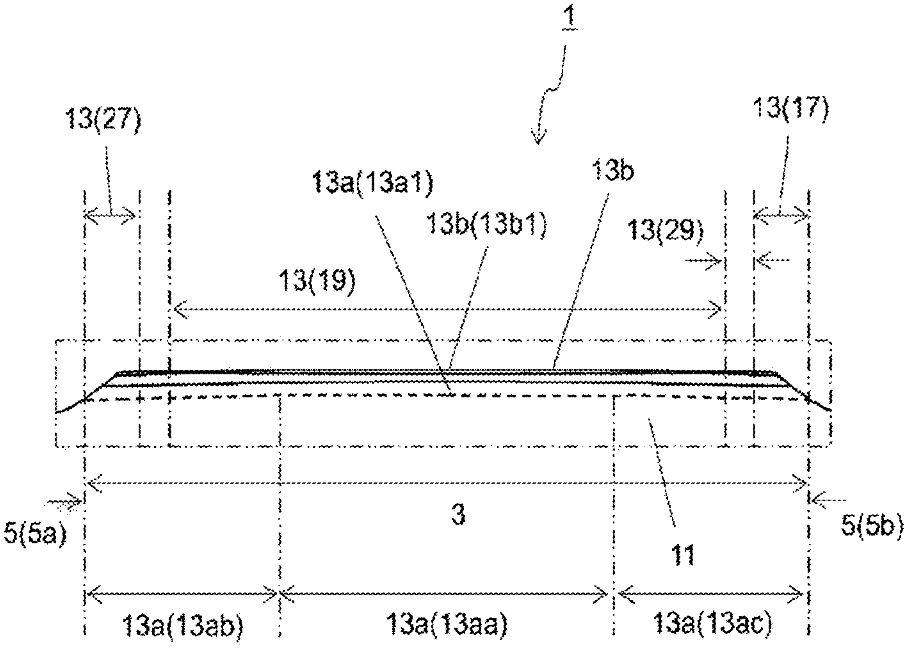
FIG. 8 is an enlarged view illustrating a variation of the insert illustrated in FIG. 7.
Figure 9:
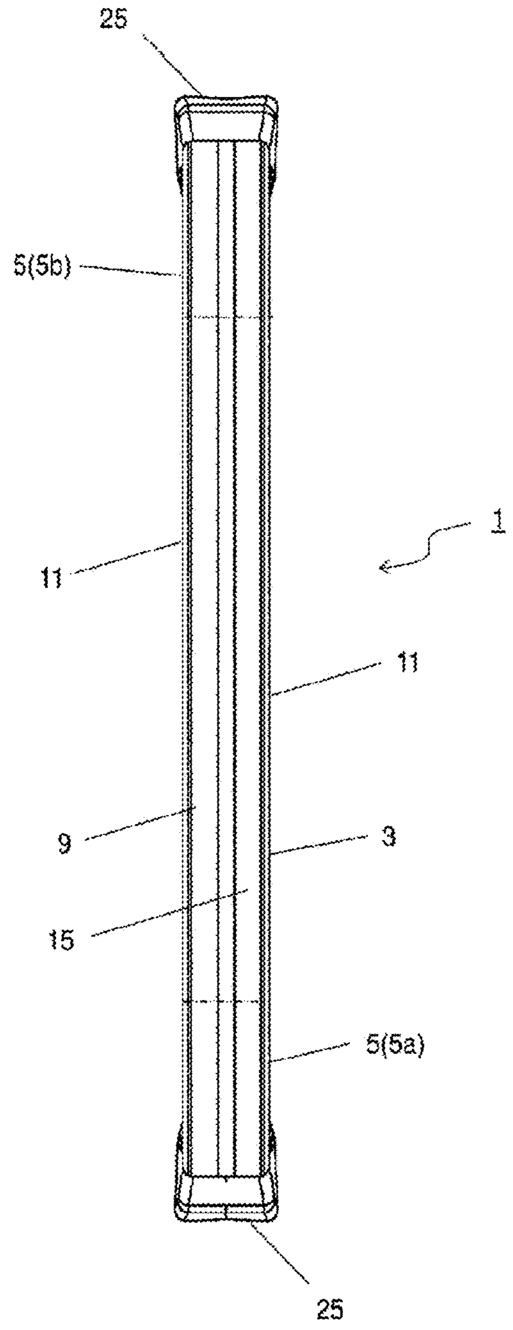
FIG. 9 is a side view of the insert illustrated in FIG. 3 viewed from a B3 direction.
Figure 10:
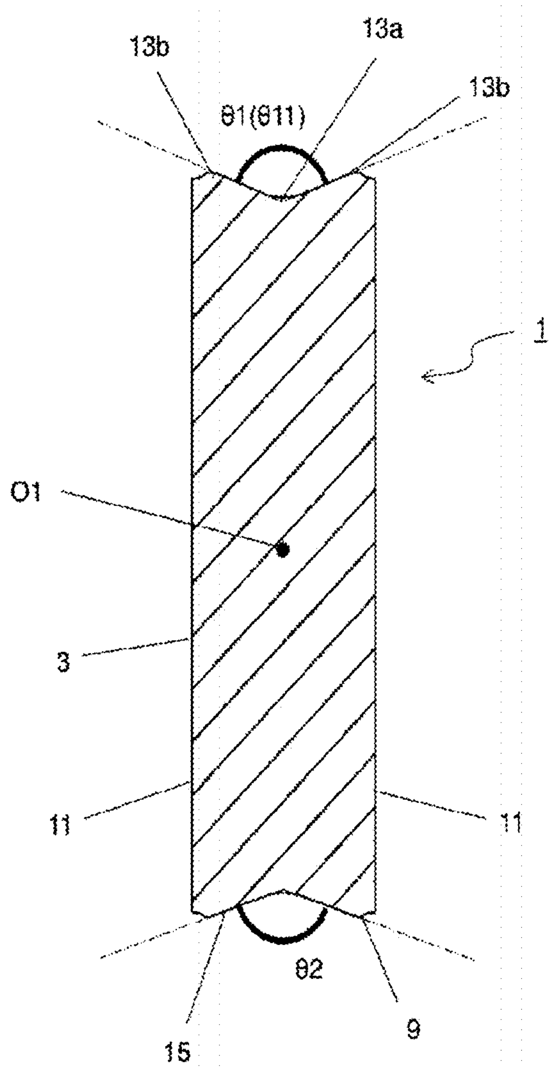
FIG. 10 is a cross-sectional view of a cross section X-X illustrated in FIG. 4.
Figure 11:
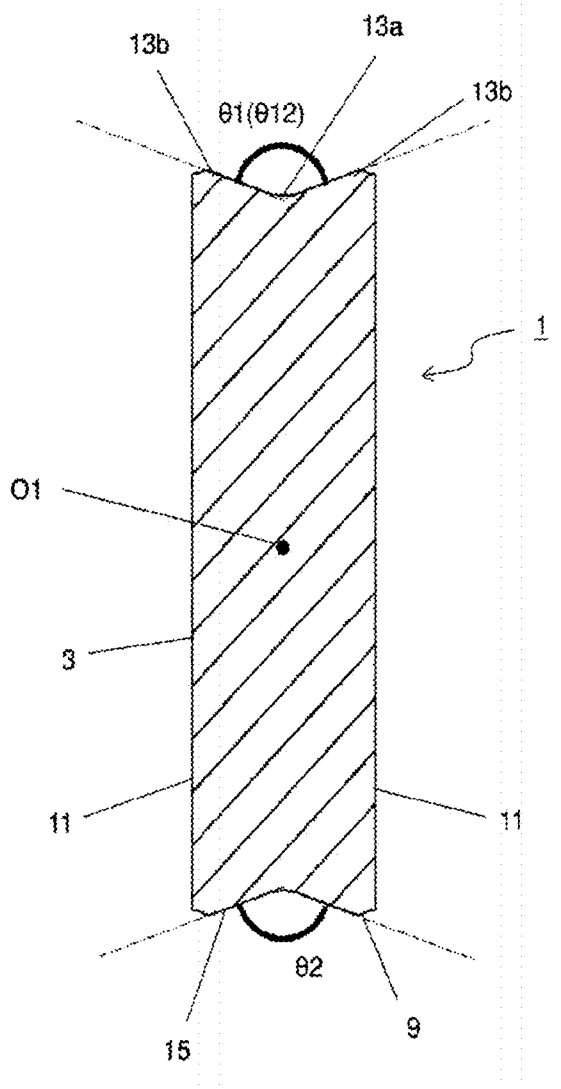
FIG. 11 is a cross-sectional view of a cross section XI-XI illustrated in FIG. 4.
Figure 12:
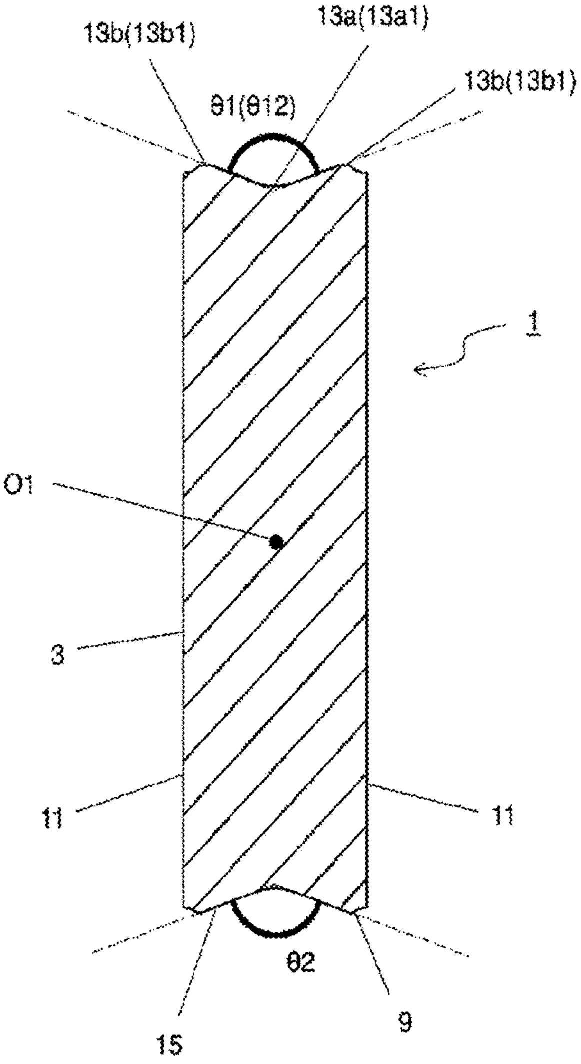
FIG. 12 is a cross-sectional view of a cross section XII-XII illustrated in FIG. 4.

The bottom portion 13*a* of the first flute 13 may be configured by a linear portion and a convex curved portion. In the non-limiting example illustrated in FIG. 8, the bottom portion 13*a* of the first flute 13 may be divided into a central portion 13*aa*, a front end portion 13*ab*, and a rear end portion 13*ac*. The central portion 13*aa* may be a central portion of the bottom portion 13*a* of the first flute 13 in the direction along the central axis O1. The front end portion 13*ab* may be a portion positioned on the front end 1*a* side with respect to the central portion 13*aa*, and may include an end portion of the bottom portion 13*a* on the front end 1*a* side. The rear end portion 13*ac* may be a portion positioned on the rear end 1*b* side with respect to the central portion 13*aa*, and may include an end portion of the bottom portion 13*a* on the rear end 1*b* side.

The front end portion 13*ab* may have a convex curve shape protruding upward. In this case, when the insert 1 is detached from the holder, the bottom portion 13*a* is less likely to be chipped. The rear end portion 13*ac* may have a convex curve shape protruding upward. In this case, when the insert 1 is attached to the holder, the bottom portion 13*a* is less likely chipped.

The central portion 13*aa* may have a linear shape. In this case, the insert 1 is likely to be stably restrained by the holder. When the central portion 13*aa* has a linear shape, the central portion 13*aa* may be parallel to the central axis O1. In this case, the insert 1 is likely to be more stably restrained by the holder.

When the bottom portion 13*a* of the first flute 13 has a convex shape protruding upward in the direction along the central axis O1, a difference in the vertical direction between the top portion 13*al* of the bottom portion 13*a* and the lowest position of the bottom portion 13*a* is set as a height difference H1. The height difference H1 is not limited to a specific value, but may be set to 0.05 to 1 mm, for example.

When the opening portion 13*b* of the first flute 13 has a convex shape protruding upward in the direction along the central axis O1, a difference in the vertical direction between the top portion 13*b*1 of the opening portion 13*b* and the lowest position of the opening portion 13*b* is set as a height difference H2. The height difference H2 is not limited to a specific value, but may be set to 0.02 to 0.07 mm, for example.

Here, the height difference H1 and the height difference H2 may be the same value and may be different values from each other. For example, the height difference H1 may be larger than the height difference H2. In this case, the top portion 13*al* of the bottom portion 13*a* is more likely to be caught by the holder while the position shift of the insert 1 in the lateral direction is suppressed.

The lower surface 9 may have a second flute 15. The second flute 15 may have a V-shape extending along the central axis O1. The configuration that the second flute 15 has a V-shape may mean that a width of the second flute 15 becomes narrower toward a bottom portion 15*a*, in other words, toward the upper surface 7, in a cross section orthogonal to the central axis O1. The bottom portion 15*a* of the second flute 15 may mean a portion of the second flute 15 positioned closest to the upper surface 7 in the cross section orthogonal to the central axis O1.

In the cross section orthogonal to the central axis O1, when virtual straight lines connecting the bottom portion 15*a* of the second flute 15 and two opening portions 15*b* of the second flute 15 are set, an intersection angle of these virtual straight lines may be an opening angle θ2 of the second flute 15. For example, in the cross section orthogonal to the central axis O1, when the second flute 15 is represented by two straight lines, an intersection angle of these straight lines may be the opening angle θ2 of the second flute 15.

The second flute 15 may extend to an end portion on the front end 1*a* side of the main body portion 3, and may be distant from the end portion on the front end 1*a* side of the main body portion 3. The second flute 15 may extend to an end portion on the rear end 1*b* side of the main body portion 3, and may be distant from the end portion on the rear end 1*b* side of the main body portion 3.

The first flute 13 and the second flute 15 may be used for the purpose of improving positioning accuracy when the insert 1 is inserted into the holder. The first flute 13 and the second flute 15 may be used for the purpose of improving a restraining force in securing the insert 1 to the holder. For example, the upper jaw of the holder may have a projection that comes into contact with the first flute 13, and the lower jaw of the holder may have a projection that comes into contact with the second flute 15, thereby improving the positioning accuracy and the restraining force.

The opening angle θ1 of the first flute 13 may be constant in the direction along the central axis O1 and may vary in the direction along the central axis O1. That is, when different portions in the direction along the central axis O1 of the first flute 13 are viewed in cross sections orthogonal to the central axis O1, respectively, the opening angles θ1 of the first flute 13 in each cross section may be the same or different.

The first flute 13 may have a first region 17 and a second region 19. The first region 17 may be positioned on the rear end 1*b* side of the first flute 13. The second region 19 may be positioned on the front end 1*a* side with respect to the first region 17. The above description shows a relative positional relationship between the first region 17 and the second region 19. Thus, a part of the second region 19 may be positioned on the rear end 1*b* side with respect to the central portion of the main body portion 3.

When the first flute 13 has the first region 17 and the second region 19, the opening angles θ1 in these regions may be different from each other. For example, the opening angle θ1 of the first flute 13 in the first region 17 is an opening angle θ11, and the opening angle θ1 of the first flute 13 in the second region 19 is an opening angle θ12. At this time, the opening angle θ11 may be smaller than the opening angle θ12. In such a case, for the following reasons, it is easy to attach to and detach from the holder, while being easily and stably restrained to the holder.

The insert 1 is attached to the holder by inserting the insert 1 from the front end 1*a* side toward the rear end 1*b* side in the holder. Here, the first region 17 may be positioned closer to the rear end 1*b* side than the second region 19. In this case, the first region 17 may come into contact with the holder earlier than the second region 19. When the opening angle θ11 of the first flute 13 in the first region 17 is smaller than the opening angle θ12 of the first flute 13 in the second region 19, the position of the insert 1 is less likely to be shifted in the lateral direction. This is because the first region 17 having a small opening angle θ11 and a steep flute surface is likely to be an obstacle to the position shift of the insert 1 in the lateral direction.

A case where the opening angle θ12 of the first flute 13 in the second region 19 is larger than the opening angle θ2 of the second flute 15 in the first region 17 will be described below. In this case, when the second region 19 comes into contact with the holder and the insert 1 is secured to the holder, the restraining force applied from the upper jaw of the holder to the insert 1 is likely to be transmitted in the vertical direction. This is because the opening angle θ12 of the first flute 13 in the second region 19 is larger than the opening angle θ2 of the second flute 15 in the first region 17, and thus, the restraining force applied from the upper jaw of the holder to the second region 19 is likely to be transmitted efficiently in the vertical direction.

The opening angle θ11 of the first region 17 is not limited to a specific value. For example, the opening angle θ11 of the first region 17 may be set to 130° to 140°. The opening angle θ12 of the second region 19 is not limited to a specific value. For example, the opening angle θ12 of the second region 19 may be set to 140° to 150°.

The opening angle θ11 of the first region 17 may be constant in the direction along the central axis O1 and may vary in the direction along the central axis O1. The opening angle θ12 of the second region 19 may be constant in the direction along the central axis O1 and may vary in the direction along the central axis O1.

In the case where the first flute 13 has the first region 17 and the second region 19, and the opening angles θ1 in these regions are different from each other, the depths of the first flute 13 in these regions may be different from each other. For example, the depth of the first flute 13 in the first region 17 may be deeper than the depth of the first flute 13 in the second region 19.

The opening angle θ12 of the second flute 15 may be constant in the direction along the central axis O1 and may vary in the direction along the central axis O1. That is, when different portions in the direction along the central axis O1 of the second flutes 15 are viewed in cross sections orthogonal to the central axis O1, the opening angles θ2 of the second flute 15 in each cross section may be the same or different.

A higher cutting load is more likely to be applied to the lower surface 9 of the main body portion 3 and the lower jaw of the holder than to the upper surface 7 of the main body portion 3 and the upper jaw of the holder. This is because not only a restraining force caused by the main body portion 3 being sandwiched between the upper jaw and the lower jaw but also a main component force of a cutting load generated in cutting a workpiece is likely to be applied to the lower surface 9 of the main body portion 3 and the lower jaw of the holder. Here, when the opening angle θ2 of the second flute 15 is constant in the direction along the central axis O1, the variation of the load in the direction along the central axis O1 of the second flute 15 can be reduced. For this reason, the insert 1 is likely to be more stably restrained by the holder.

From a standpoint of stable constraint of the insert 1 with respect to the holder, the second flute 15 may have two flat surfaces that approach each other as they approach the bottom portion 15*a*. In this case, the second flute 15 and the holder are likely to come into surface contact with each other. For this reason, the variation in the load applied from the second flute 15 to the holder can be further reduced.

The opening angle θ2 of the second flute 15 is not limited to a specific value. For example, the opening angle θ2 of the second flute 15 may be set to 140° to 150°. The opening angle θ2 of the second flute 15 may be the same as the opening angle θ12 of the first flute 13 in the second region 19. In this case, the insert 1 is likely to be smoothly attached to the holder. The above-described "same" does not require that the two opening angles be exactly the same. A difference 80 between the two opening angles may be approximately 2° or less.

The first cutting portion 5*a* positioned on the front end 1*a* side of the insert 1 may have a front end surface 21, an upper end surface 23, and a cutting edge 25. The front end surface 21 may be a surface positioned at the front end 1*a* of the insert 1. The upper end surface 23 may be a surface connected to the front end surface 21 and extending from the front end surface 21 toward the upper surface 7 of the main body. The cutting edge 25 may be positioned at an intersection of the front end surface 21 and the upper end surface 23. The front end surface 21 may function as a flank surface for the cutting edge 25. The upper end surface 23 may function as a rake surface for the cutting edge 25.

The first flute 13 may further have a third region 27, in addition to the first region 17 and the second region 19. The third region 27 may be positioned on the front end 1*a* side with respect to the second region 19. In other words, the second region 19 may be positioned on the rear end 1*b* side with respect to the third region 27. The above description shows a relative positional relationship between the third region 27 and the second region 19. Thus, a part of the second region 19 may be positioned on the front end 1*a* side with respect to the central portion of the main body portion 3.

When the first flute 13 has the third region 27, the opening angle θ1 of the first flute 13 in the third region 27 is an opening angle θ13. The opening angle θ13 may be smaller than the opening angle θ12 of the first flute 13 in the second region 19. In such a case, for the following reasons, it is easy to attach and detach the insert 1 to and from the holder while easily and stably restraining the insert 1 by the holder.

When the opening angle θ13 of the first flute 13 in the first region 27 is smaller than the opening angle θ12 of the first flute 13 in the second region 19, the position shift of the insert 3 in the lateral direction is less likely to occur. This is because the third region 27 having a small opening angle θ13 and a steep flute surface is likely to be an obstacle to the position shift of the insert 1 in the lateral direction.

A case where the first flute 13 has a shape in which the opening angle θ13 is relatively small in the first region 17 positioned on the rear end 1*b* side of the first flute 13 and the third region 27 positioned on the front end 1*a* side of the first flute 13 will be described below. In this case, the position shift of the insert 1 in the lateral direction is likely to be reduced at two locations on the front end 1*a* side and the rear end 1*b* side of the main body. For this reason, when the insert 1 is attached to the holder, the position shift of the insert 1 in the lateral direction can be efficiently reduced.

Figure 5:
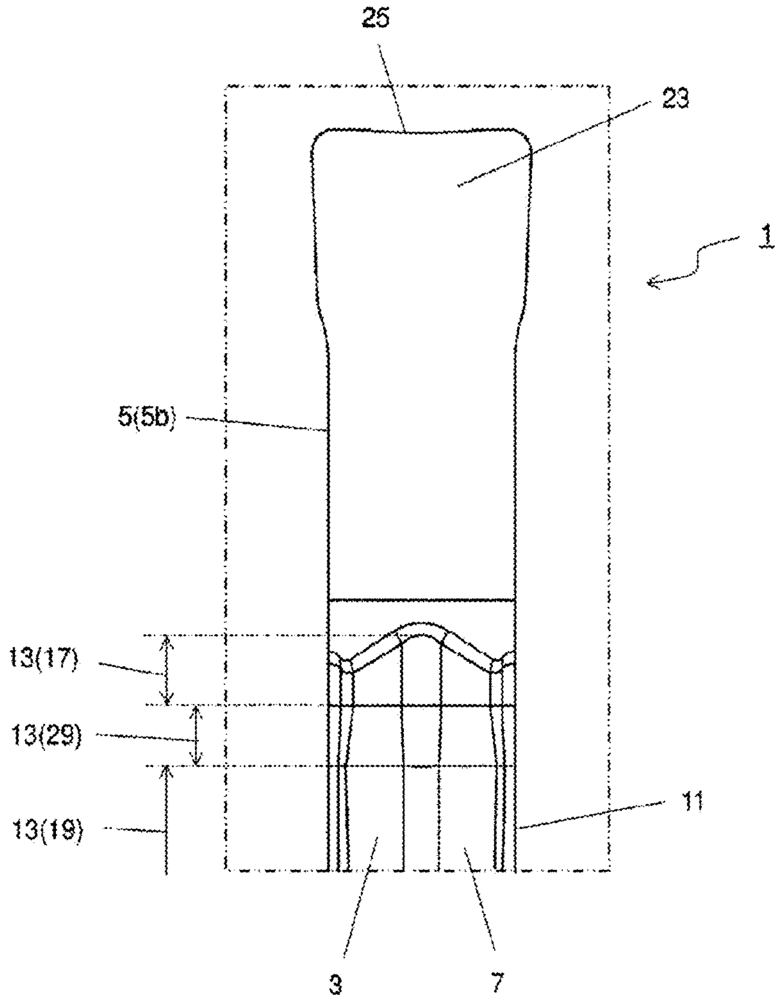
FIG. 5 is an enlarged view of a region A2 illustrated in FIG. 4.
Figure 6:
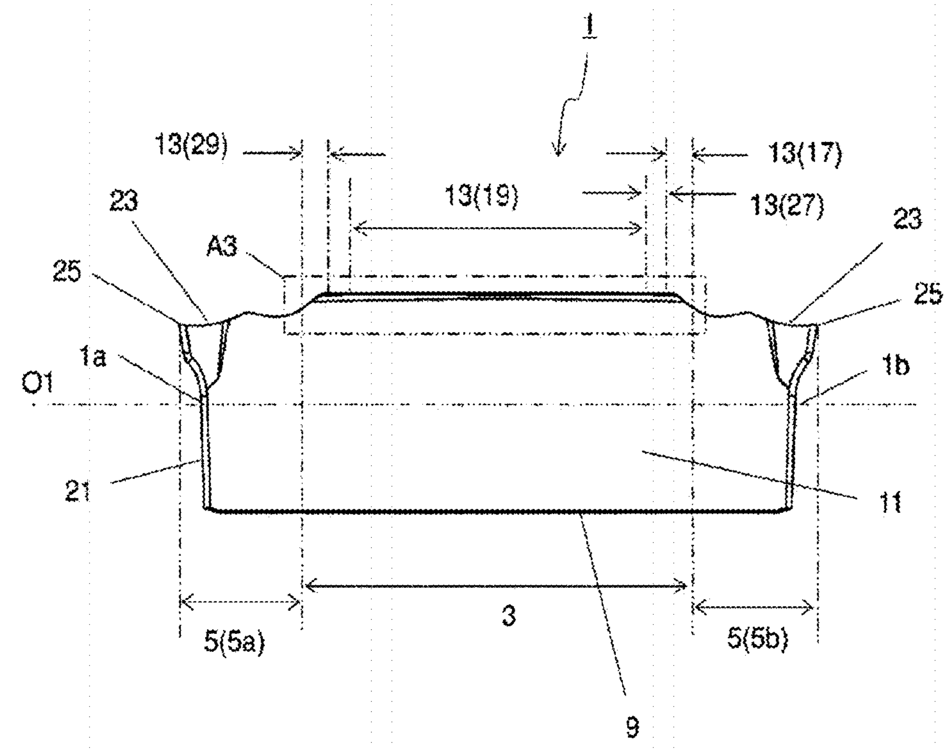
FIG. 6 is a side view of the insert illustrated in FIG. 3 viewed from a B2 direction.

A case where the insert 1 has the first cutting portion 5*a* and the second cutting portion 5*b* as in a non-limiting example illustrated in FIG. 5 will be described below. In this case, even if the insert 1 is attached to the holder with the front end 1*a* and the rear end 1*b* of the insert 1 reversed, the position shift of the insert 1 in the lateral direction is less likely to occur due to the third region 27.

The opening angle θ13 of the third region 27 is not limited to a specific value. For example, the opening angle θ13 of the third region 27 may be set to 130° to 140°. From a standpoint of reducing the variation in the cutting load applied to the first region 17 and the third region 27 for reducing the position shift of the insert 1 in the lateral direction, the opening angle θ13 of the first flute 13 in the third region 27 may be the same as the opening angle θ11 of the first flute 13 in the first region 17.

The configuration that the opening angle θ13 is the same as the opening angle θ11 does not require that these opening angles be exactly the same. As in the case of the opening angle θ2 and the opening angle θ12 described above, the difference δθ between the two opening angles may be approximately 2° or less.

The first flute 13 may further have a fourth region 29, in addition to the first region 17 and the second region 19. The fourth region 29 may be positioned between the first region 17 and the second region 19. The opening angle θ1 of the first flute 13 in the fourth region 29 is an opening angle θ14. Here, the opening angles θ11 and θ12 of the first flute 13 in the first region 17 and the second region 19 may be constant, respectively. The opening angle θ14 of the first flute 13 in the fourth region 29 may increase toward the second region 19.

When the opening angle θ11 of the first flute 13 in the first region 17 is constant, the effect of reducing the position shift of the insert 1 in the lateral direction by the first region 17 is stably obtained. When the opening angle θ12 of the first flute 13 in the second region 19 is constant, the influence of the position of the insert 1 in contact with the upper jaw of the holder is small, and the restraining force applied from the upper jaw of the holder to the second region 19 is likely to be efficiently transmitted in the vertical direction. That is, dependency on the shape of the holder is small, and versatility of the insert 1 is high.

A case in which the opening angle θ14 of the first flute 13 in the fourth region 29 increases toward the second region 19 will be described below. In this case, a concern that the opening angle of the first flute 13 will abruptly change from the first region 17 to the second region 19 due to the difference between the opening angles of the first flute 13 in the first region 17 and the second region 19 can be reduced. For this reason, the insert 1 can be smoothly attached to the holder.

In the above description, the first flute 13 may have the first region 17, the second region 19, and the fourth region 29 but may not have the third region 27, and may have the first region 17, the second region 19, the third region 27, and the fourth region 29.

From a standpoint of reducing the influence of the position of the insert 1 in contact with the upper jaw of the holder, a length L2 of the second region 19 may be longer than a length L1 of the first region 17 in the direction along the central axis O1. For example, a ratio (L2/L1) of the length L2 of the second region 19 to the length L1 of the first region 17 may be 30 to 40.

Examples of a material of the insert 1 may include cemented carbide alloy and cermet. The composition of the cemented carbide alloy may include WC—Co, WC—TiC—Co, and WC—TiC—TaC—Co, for example. Here, WC, TiC and TaC may be hard particles, and Co may be a binder phase.

Cermet may be a sintered composite material in which metal is combined with a ceramic component. Examples of the cermet may include titanium compounds in which one of titanium carbide (TiC) and titanium nitride (TiN) is a main component. However, the material of the insert 1 is not limited to the composition described above.

A surface of the insert 1 may be coated with a coating film using a chemical vapor deposition (CVD) method or a physical vapor deposition (PVD) method. Examples of the composition of the coating film may include titanium carbide (TiC), titanium nitride (TiN), titanium carbonitride (TiCN), and alumina ($Al_2O_3$).

Cutting Tool

Figure 13:
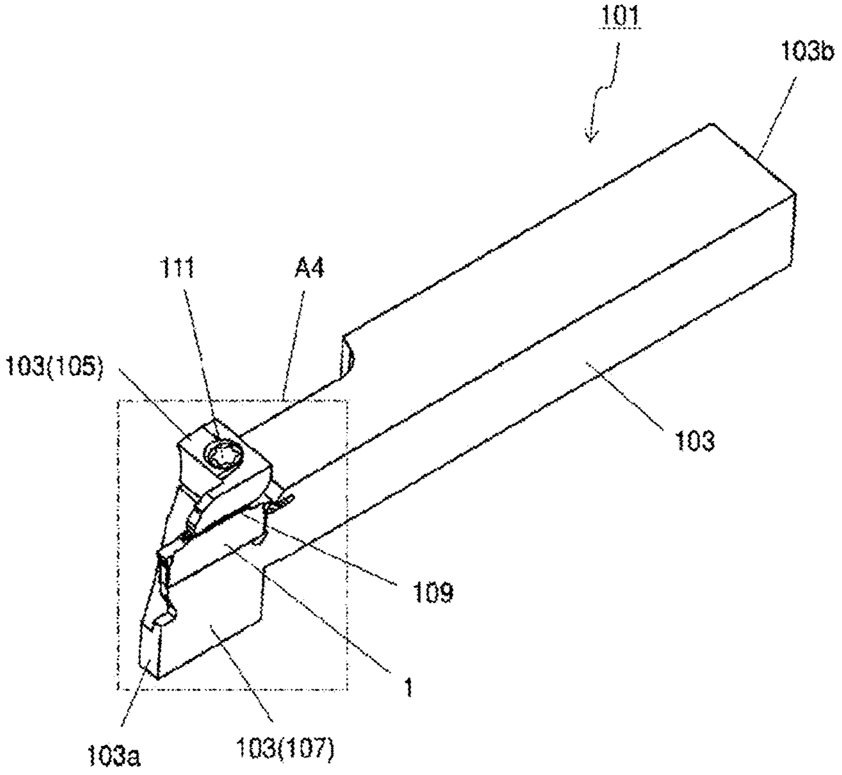
FIG. 13 is a perspective view illustrating a cutting tool of a non-limiting embodiment.

A cutting tool 101 according to one non-limiting aspect of the present disclosure will be described in detail with reference to the drawings. Examples of the cutting tool 101 may include a turning tool and a milling tool. Examples of the turning tool may include a flute-forming tool and a cutting-off tool. The cutting tool 101 in one non-limiting example illustrated in FIG. 13 is a cutting-off tool.

The cutting tool 101 includes a holder 103 and the insert 1. The holder 103 and the insert 1 are separate members from each other, and the holder 103 is a member for holding the insert 1. When the insert 1 is worn during cutting processing of a workpiece 201 for manufacturing a machined product 203, the worn insert 1 may be removed from the holder 103 and another insert 1 may be attached to the holder 103. By replacing the insert 1, the cutting processing of the workpiece 201 can continue.

Figure 16:
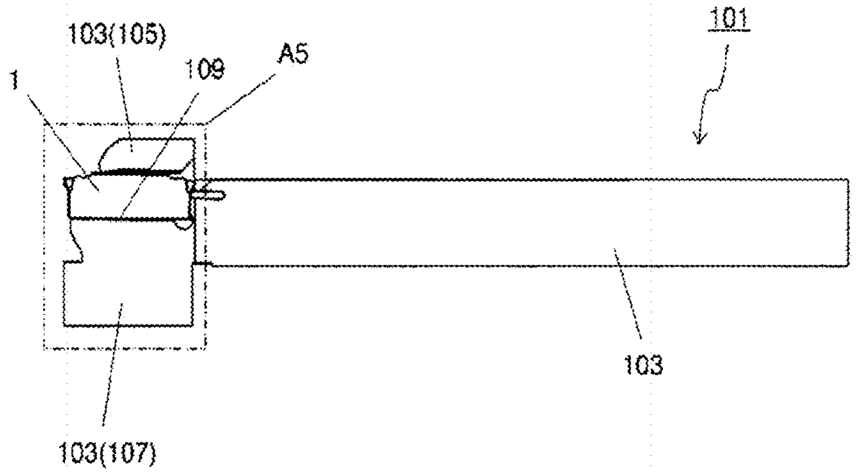
FIG. 16 is a side view of the cutting tool illustrated in FIG. 15 viewed from a B4 direction.
Figure 17:
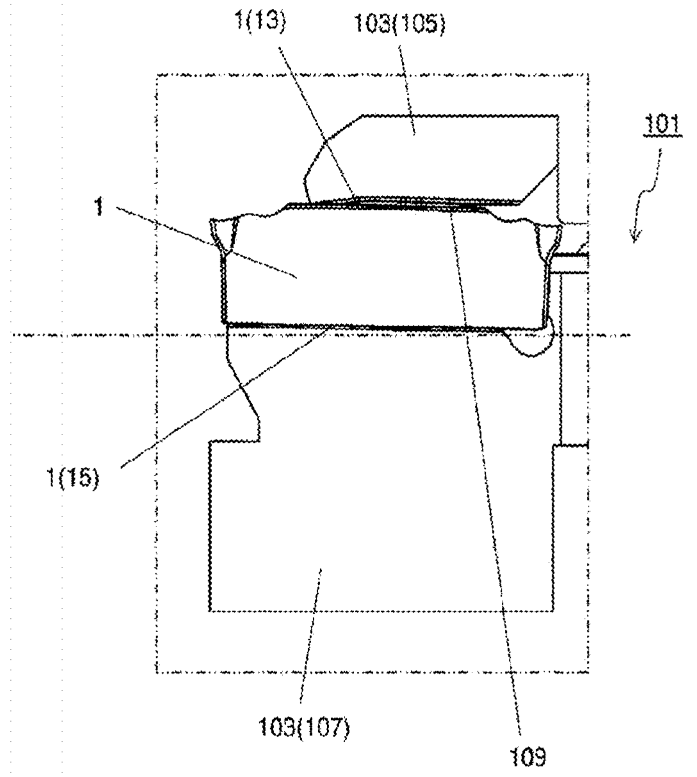
FIG. 17 is an enlarged view of a region A5 illustrated in FIG. 16.

The holder 103 may have an elongated rod shape. Specifically, as in one non-limiting example illustrated in FIG. 13, the holder 103 may have a quadrangular prism shape. The holder 103 may extend from a first end 103*a* toward a second end 103*b*, as in one non-limiting example illustrated in FIGS. 13 and 16.

The holder 103 may include an upper jaw 105, a lower jaw 107, and a pocket 109 each positioned on the first end 103*a* side. The pocket 109 may be a space positioned between the upper jaw 105 and the lower jaw 107. The insert 1 can be inserted into the pocket 109. The insert 1 may be secured to the holder 103 by sandwiching the insert 1 between the upper jaw 105 and the lower jaw 107.

Figure 14:
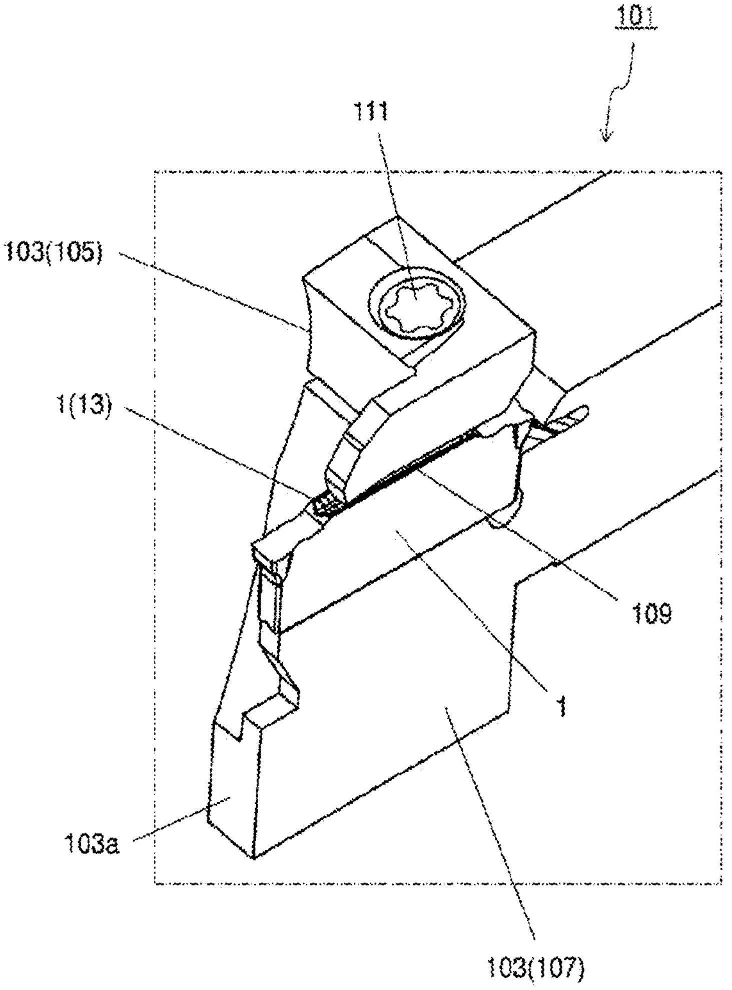
FIG. 14 is an enlarged view of a region A4 illustrated in FIG. 13.
Figure 15:
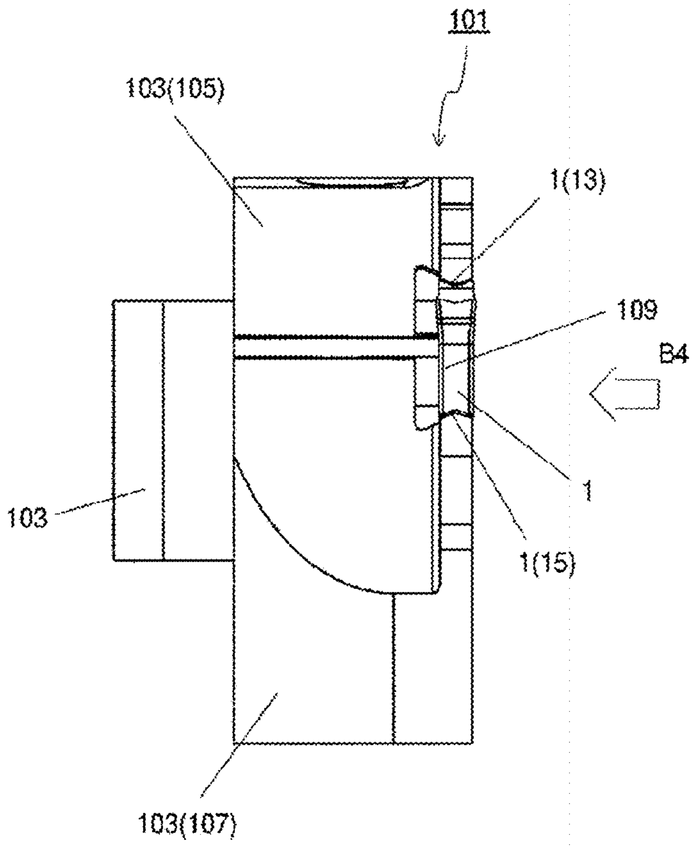
FIG. 15 is a plan view of the cutting tool illustrated in FIG. 13 viewed from a front end side.

As in one non-limiting example illustrated in FIG. 14, the insert 1 may be secured to the holder 103 by a screw 111. For example, a screw hole may be provided in the upper jaw 105 of the holder 103, and a screw groove may be provided in the lower jaw 107 of the holder 103. The insert 1 may be attached to the pocket 109 by inserting the screw 111 into the screw hole of the upper jaw 105 and fixing the screw 111 in the screw groove described above. The insert 1 may be attached to the pocket 109 by a so-called self-restraining method without using the screw 111. In these cases, it can also be said that the insert 1 is positioned in the pocket 109.

Steel, cast iron, or the like may be used as a material of the holder 103. In particular, when steel is used among those materials, toughness of the holder 103 is high.

Method for Manufacturing Machined Product A method for manufacturing a machined product according to one non-limiting aspect of the present disclosure will be described with reference to the drawings.

A machined product 203 is manufactured by carrying out cutting processing of the workpiece 201. The method for manufacturing the machined product 203 in the embodiment includes the following steps: (1) rotating the workpiece 201, (2) bringing the cutting tool 101 represented by the embodiment described above into contact with the workpiece 201 being rotated, and (3) separating the cutting tool 101 from the workpiece 201.

Figure 18:
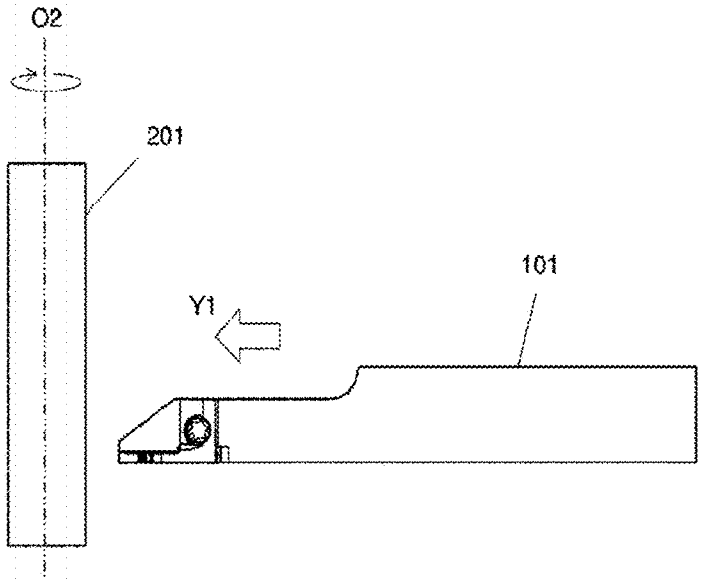
FIG. 18 is a schematic view illustrating a step of a method for manufacturing a machined product of a non-limiting embodiment.

More specifically, firstly, as in one non-limiting example illustrated in FIG. 18, the cutting tool 1 may be relatively brought close to the workpiece 201 while rotating the cutting tool 1 around an axis O2. As in one non-limiting example illustrated in FIG. 19, the workpiece 201 may be cut out by bringing at least a part of the cutting edge 25 of the cutting tool 101 into contact with the workpiece 201. As in one non-limiting example illustrated in FIG. 20, the cutting tool 101 may be relatively moved away from the workpiece 201.

As in one non-limiting example illustrated in FIG. 18, the cutting tool 101 may be brought close to the workpiece 201 by moving the cutting tool 101 in a Y1 direction in a state where the axis O2 is fixed and the workpiece 201 is rotated.

Figure 19:
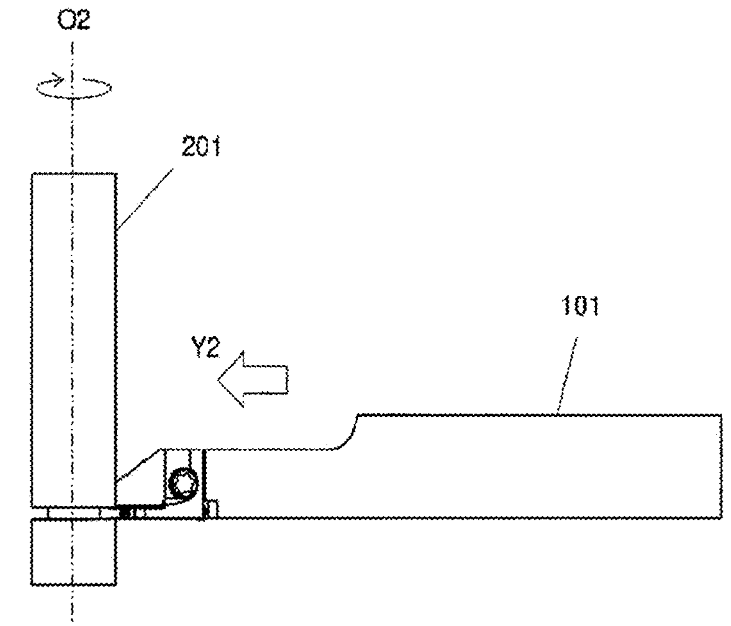
FIG. 19 is a schematic view illustrating a step of the method for manufacturing a machined product of the non-limiting embodiment.

As in one non-limiting example illustrated in FIG. 19, the workpiece 201 may be cut out by moving the cutting tool 101 in a Y2 direction in a state where at least a part of a portion of the insert used as the cutting edge is in contact with the workpiece 201 being rotated.

Figure 20:
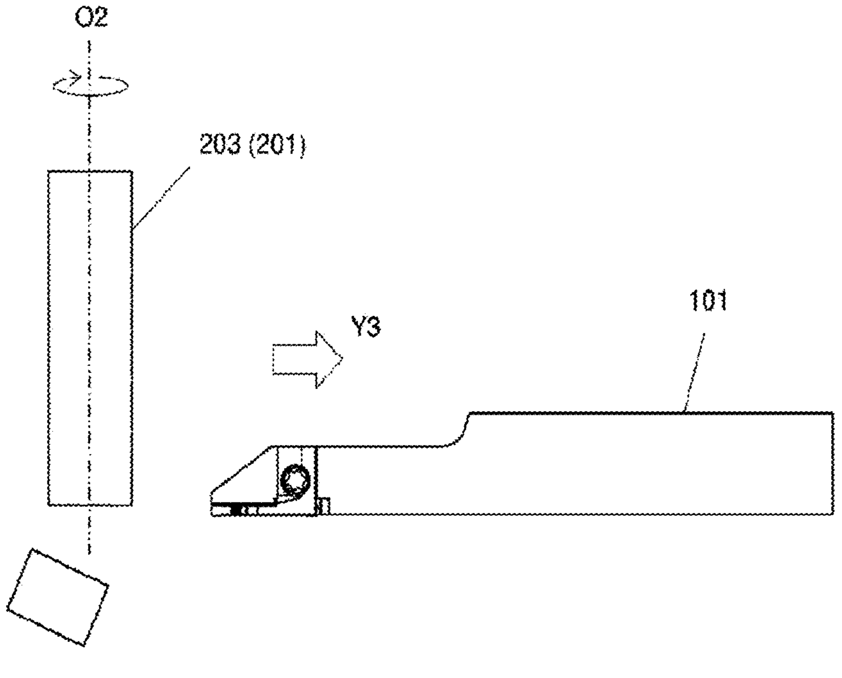
FIG. 20 is a schematic view illustrating a step of the method for manufacturing a machined product of the non-limiting embodiment.

As in one non-limiting example illustrated in FIG. 20, the cutting tool 101 may be moved away from the workpiece 201 by moving the cutting tool 101 in a Y3 direction in a state where the workpiece 201 is rotated.

By moving the cutting tool 101 in each step, the cutting tool 101 is brought into contact with the workpiece 201 or the cutting tool 101 is separated from the workpiece 201. However, it is not intended to limit the embodiment to such a form.

For example, in step (1), the workpiece 201 may be brought close to the cutting tool 101. In step (3), the workpiece 201 may be moved away from the cutting tool 101. If intended to continue the cutting processing, a step of bringing at least a part of the cutting edge of the insert 1 into contact with different locations of the workpiece 201 may be repeated while keeping the workpiece 201 rotated.

Representative examples of the material of the workpiece 201 may include hardened steel, carbon steel, alloy steel, stainless steel, cast iron, and non-ferrous metals.

REFERENCE SIGNS

1 Insert
1*a* Front end
1*b* Rear end
3 Main body portion
5 Cutting portion
5*a* First cutting portion
5*b* Second cutting portion
7 Upper surface
9 Lower surface
11 Side surface
13 First flute
13*a* Bottom portion
13*a*1 Top portion
13*b* Opening portion
13*b*1 Top portion
15 Second flute
15*a* Bottom portion
15*b* Opening portion
17 First region
19 Second region
21 Front end surface
23 Upper end surface
25 Cutting edge
27 Third region
29 Fourth region
101 Cutting tool
103 Holder
103*a* First end
103*b* Second end
105 Upper jaw
107 Lower jaw
109 Pocket
111 Screw
201 Workpiece
203 Machined product

The invention claimed is:

1. A cutting insert extending from a front end toward a rear end along a central axis, the cutting insert comprising:
- a cutting portion positioned at a side of the front end and comprising a cutting edge positioned at the front end; and
- a main body portion positioned closer to the rear end than the cutting portion,
- wherein the main body portion includes:
  - an upper surface comprising a V-shaped flute extending parallel to the central axis;
  - a lower surface positioned on a side opposite from the upper surface; and
  - a side surface connected to the upper surface and the lower surface and extending along the central axis,
- wherein an opening portion and a bottom portion of the flute each have a convex shape protruding upward in a direction along the central axis,
- wherein the flute comprises:
  - a first region positioned at a side of the rear end,
  - a second region positioned closer to the front end than the first region, and
  - a fourth region positioned between the first region and the second region, wherein an opening angle of the flute in the first region is smaller than an opening angle of the flute in the second region, and wherein an opening angle of the flute in the fourth region increases toward the second region.

2. The cutting insert according to claim 1, wherein the flute further has a third region positioned closer to the front end than the second region, and wherein an opening angle of the flute in the third region is smaller than the opening angle of the flute in the second region.

3. The cutting insert according to claim 2, wherein the opening angle of the flute in the third region is same as the opening angle of the flute in the first region.

4. The cutting insert according to claim 1, wherein the opening portion of the flute has a convex curve shape protruding upward in the direction along the central axis.

5. The cutting insert according to claim 4, wherein the bottom portion of the flute has a convex curve shape protruding upward in the direction along the central axis.

6. The cutting insert according to claim 4, wherein, in the direction along the central axis, the bottom portion comprises a central portion having a linear shape, and a first portion positioned closer to the front end than the central portion and having a convex curve shape protruding upward.

7. The cutting insert according to claim 1, wherein a depth of the flute in the first region is deeper than a depth of the flute in the second region.

8. A cutting tool, comprising:

a holder having a rod shape extending from a first end to a second end, and comprising a pocket positioned at the first end; and a cutting insert positioned in the pocket, the cutting insert extending from a front end toward a rear end along a central axis, the cutting insert including:

a cutting portion positioned at a side of the front end and comprising a cutting edge positioned at the front end; and a main body portion positioned closer to the rear end than the cutting portion, wherein the main body portion includes:

an upper surface comprising a V-shaped flute extending parallel to the central axis;

a lower surface positioned on a side opposite from the upper surface; and a side surface connected to the upper surface and the lower surface and extending along the central axis, wherein an opening portion and a bottom portion of the flute each have a convex shape protruding in a direction along the central axis, wherein the flute includes:

a first region positioned at a side of the rear end, a second region positioned closer to the front end than the first region, and a fourth region positioned between the first region and the second region, wherein an opening angle of the flute in the first region is smaller than an opening angle of the flute in the second region, and wherein an opening angle of the flute in the fourth region increases toward the second region.

9. A method for manufacturing a machined product, the method comprising:

rotating a workpiece;

bringing a cutting tool into contact with the workpiece being rotated; and separating the cutting tool from the workpiece, wherein the cutting tool includes:

a holder having a rod shape extending from a first end to a second end, and comprising a pocket positioned at the first end; and a cutting insert positioned in the pocket, the cutting insert extending from a front end toward a rear end along a central axis, the cutting insert including:

a cutting portion positioned at a side of the front end and comprising a cutting edge positioned at the front end; and a main body portion positioned closer to the rear end than the cutting portion, wherein the main body portion includes:

an upper surface comprising a V-shaped flute extending parallel to the central axis;

a lower surface positioned on a side opposite from the upper surface; and a side surface connected to the upper surface and the lower surface and extending along the central axis, wherein an opening portion and a bottom portion of the flute each have a convex shape protruding in a direction along the central axis, wherein the flute includes:

a first region positioned at a side of the rear end, a second region positioned closer to the front end than the first region, and a fourth region positioned between the first region and the second region, wherein an opening angle of the flute in the first region is smaller than an opening angle of the flute in the second region, and wherein an opening angle of the flute in the fourth region increases toward the second region.

* * * * *